US007554705B2

(12) United States Patent
Edge

(10) Patent No.: US 7,554,705 B2
(45) Date of Patent: Jun. 30, 2009

(54) COLOR GAMUT MAPPING WITH BLACK POINT COMPENSATION

(75) Inventor: Christopher J. Edge, St. Paul, MN (US)

(73) Assignee: Eastman Kodak Company, Rochester, NY (US)

(*) Notice: Subject to any disclaimer, the term of this patent is extended or adjusted under 35 U.S.C. 154(b) by 439 days.

(21) Appl. No.: 11/354,482

(22) Filed: Feb. 15, 2006

(65) Prior Publication Data
US 2007/0188780 A1   Aug. 16, 2007

(51) Int. Cl.
*G03F 3/08* (2006.01)
(52) U.S. Cl. .................. 358/529; 358/1.9; 358/518; 358/519; 382/162; 382/167
(58) Field of Classification Search .................. 358/1.9, 358/519, 520, 518, 529; 382/162, 167; 345/604
See application file for complete search history.

(56) References Cited

U.S. PATENT DOCUMENTS

| | | | | |
|---|---|---|---|---|
| 5,699,491 | A * | 12/1997 | Barzel | 358/1.9 |
| 5,809,164 | A * | 9/1998 | Hultgren, III | 382/162 |
| 6,459,501 | B1 * | 10/2002 | Holmes | 358/1.9 |
| 6,618,171 | B1 * | 9/2003 | Tse et al. | 358/446 |
| 7,068,853 | B2 * | 6/2006 | Loveridge et al. | 382/274 |
| 7,116,441 | B1 * | 10/2006 | Matsuoka | 358/1.9 |
| 7,277,200 | B2 * | 10/2007 | Ohga | 358/1.9 |
| 2003/0038957 | A1 * | 2/2003 | Sharman | 358/1.9 |
| 2003/0184779 | A1 | 10/2003 | Ohga | |
| 2005/0168481 | A1 * | 8/2005 | Wilt et al. | 345/604 |
| 2006/0285137 | A1 * | 12/2006 | Namikata | 358/1.9 |

FOREIGN PATENT DOCUMENTS

EP          1 298 917          4/2003

OTHER PUBLICATIONS

Wei-Ling Chu et al.: "ColorSync: synchronizing the color behavior of your devices" Digest of Papers of Compcon (Computer Society Conference) 1996 Technologies for the Information Superhighway. Santa Clara, Feb. 25-28, 1996, Digetst of Papers of the Computer Society Computer Conference Compcon, Los Alamitos, IEEE Comp. Soc. Press, vol. Conf. 41, Feb. 25, 1996, pp. 440-444, XP010160934; ISBN: 0-8186-7414-8; Sections 2.3 and 3.2.

(Continued)

*Primary Examiner*—Mark K Zimmerman
*Assistant Examiner*—Miya J Cato
(74) *Attorney, Agent, or Firm*—Nelson Adrian Blish

(57) ABSTRACT

The disclosure is directed to techniques for gamut mapping with modified black point compensation (BPC). The gamut mapping techniques promote well-distributed tone compression so that substantial loss of detail in highlight and shadow regions can be avoided. The gamut mapping techniques may be particularly useful in converting rich saturated images, such as RGB photographs, for presentation as much less saturated output, such as typical newsprint. Other example applications include conversion of CMYK Specifications for Web Offset Printing (SWOP) printing to CMYK Specifications for Newsprint Advertising Production (SNAP) newsprint, and conversion of RGB photos with camera profiling software to CMYK for all types of printing.

12 Claims, 9 Drawing Sheets

OTHER PUBLICATIONS

Braun G. J. et al: "Gamut Mapping for Pictorial Images" Taga Proceedings, XX, XX, 1999, pp. 645-660, XP008078676 p. 646 "Gamut Mapping Algorithms/Lightness scaling", p. 649 "Color spaces for gamut mapping".

John Nate: "Black point compensation: Thumbs up or down?" The International Journal of Newspaper Technology, [Online] May 2004, XP002443357; Retrieved from the Internet: URL:222.newsandtech.com/issues/2004/05-04/pt/05-04_blackpoint.htm>[retrieved on Jul. 17, 2007] the whole document.

The Critically Important Color and Gamma Calibration Article contributed by Sams Pulbishing—pp. 1-39, 2004 http://www.devarticles.com/c/a/Photoshop/The-Critically-Important-Color-and_Gamma-Calibration-Article/.

Black Point Compensation from Adobe Systems, Lars Borg, Feb. 2004.

Black Point Compensation, Andrew Rodney, The Digital Dog, www.digitaldog.com, Sep. 2004.

KPG CFM White Paper Leveraging the Power of the KPG Color Fidelity Module by Dr. Christopher Edge, Jul. 12, 2004.

* cited by examiner

COLOR GAMUT MAPPING WITH BLACK POINT COMPENSATION

TECHNICAL FIELD

The invention relates to color imaging and, more particularly, techniques for color gamut mapping.

BACKGROUND

Color gamut refers to the range of colors that can be reproduced by an imaging device. Various imaging devices present different color gamuts. For example, one imaging device may be able to reproduce a wider range of colors than another imaging device. Alternatively, one imaging device may be able to reproduce a wider range in one or more areas of color space. Gamut differences may arise between devices that operate in the same color space or different color spaces. For example, various cyan-magenta-yellow-black (CMYK) devices may yield different CMYK gamuts. Similarly, the gamuts associated with red-green-blue (RGB) and CMYK devices may be different from one another. Color image data is typically converted using color profiles, such as International Color Consortium (ICC) profiles, that define the colorimetric responses of different imaging devices.

Gamut differences require care in mapping color image data from one imaging device for output by another imaging device. Gamut differences can be particularly pronounced in the darker regions of an image. For example, two different imaging devices may have substantially different black points, i.e., the darkest color value that can be reproduced by a device. Black point compensation (BPC) is a technique that can be used in conjunction with relative colorimetric conversions of images to perform gamut mapping. The BPC technique ordinarily involves adjusting the black scaling of colorimetric values in XYZ or linear RGB space in order to map the black point of one system, such as RGB, to that of another system, such as CMYK. The tonal range of an image is determined by the number of intermediate gray values between the white point and black point of the image. Black point matching techniques evaluate source and destination black points and apply corrections to avoid undesirable visual effects.

SUMMARY

In general, the invention is directed to a technique for gamut mapping with modified black point compensation (BPC). According to the modified gamut mapping technique, a nonlinear tone compression mapping is applied to first device-independent color values in a first gamut to produce second device-dependent color values in the second gamut. The nonlinear tone compression mapping may produce a gradual increase in tone compression from highlight tones to shadow tones, and minimal correction to highlight tones as they approach a maximum value. The nonlinear tone compression mapping may assume a reasonably perceptual RGB color space, e.g., in which the gamma of the RGB space is in a range of approximately 1.5 to 3.0.

The gamut mapping technique described in this disclosure promotes well-distributed tone compression so that substantial loss of detail in highlight and shadow regions can be avoided. A gamut mapping technique with modified black point compensation may be particularly useful in converting rich saturated images, such as RGB photographs, for presentation as much less saturated output, such as newsprint. Other example applications include conversion of CMYK Specifications for Web Offset Printing (SWOP) printing to CMYK Specifications for Newsprint Advertising Production (SNAP) newsprint, and conversion of RGB photos with camera profiling software to CMYK for all types of printing.

In one embodiment, the invention provides a method for mapping color values from a first gamut to a second gamut, the method comprising obtaining first device-independent color values in a first gamut, and applying a nonlinear tone compression mapping to the first device-independent color values to produce second device-dependent color values in the second gamut. The invention also contemplates computer-readable media comprising instructions to cause a processor to perform such a method.

In another embodiment, the invention provides a system for mapping color values from a first gamut to a second gamut, the system comprising a processor programmed to obtain first device-independent color values in a first gamut, and apply a nonlinear tone compression mapping to the first device-independent color values to produce second device-dependent color values in the second gamut.

In various embodiments, the invention may provide one or more advantages. For example, the gamut mapping techniques described in this disclosure may be capable of achieving black point compensation without substantial loss of shadow detail. The techniques may be less complicated and do not generally require manual intervention to achieve desired black point compensation. In addition, the techniques may enable the use of maximum gray component replacement (GCR) for conversion of RGB input to CMYK output, while limiting loss of shadow detail. The techniques also may reduce or eliminate artifacts in saturated color images arising from black point compensation. Further, the techniques may reduce or eliminate gross distortions of the gamut boundary when expanding the gamut of a less-saturated imaging system for purposes of optimal gamut mapping.

The details of one or more embodiments of the invention are set forth in the accompanying drawings and the description below. Other features and advantages of the invention will be apparent from the description and drawings, and from the claims.

DETAILED DESCRIPTION

Figure 1A:
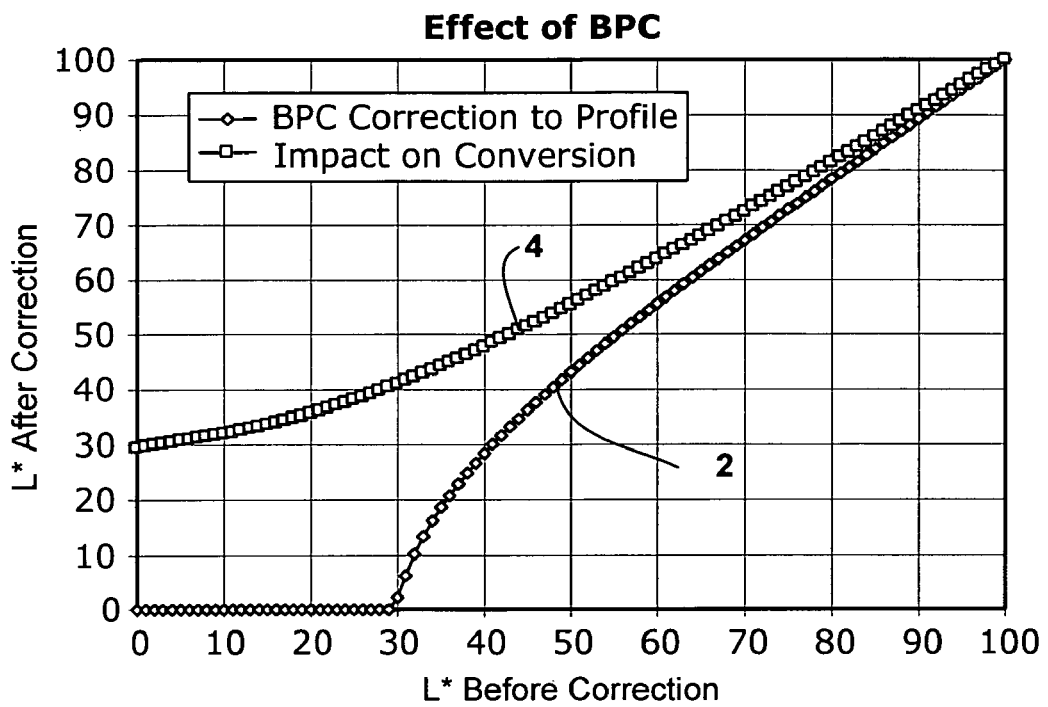
FIG. 1A is a graph illustrating the effect of a conventional BPC technique on mapping of source device color values to destination device color values.

In various embodiments, the invention is directed to techniques for gamut mapping with black point compensation (BPC). The gamut mapping techniques promote well-distributed tone compression so that substantial loss of detail in highlight and shadow regions can be avoided. The gamut mapping techniques may be particularly useful in converting rich saturated images, such as RGB photographs, for presentation as much less saturated output, such as typical newsprint. Other example applications include conversion of CMYK Specifications for Web Offset Printing (SWOP) printing to CMYK Specifications for Newsprint Advertising Production (SNAP) newsprint, and conversion of RGB photos with camera profiling software to CMYK for all types of printing.

Conventional BPC techniques have attempted to scale the black point of one color space (e.g., RGB=0 for AdbobeRGB98) to that of another (e.g., K=100% or CMYK (total)=320% for SWOP CMYK). However, conventional BPC techniques then apply to excessive compression in the shadow tones, resulting in substantial loss of shadow detail. Using a modified BPC technique, in accordance with an embodiment of the invention, the black point of one color space can be mapped to the black point of another color space with a more well-distributed tone compression so that substantial loss of detail in highlight and shadow tones can be reduced. For purposes of illustration, and not limitation, the invention will be described in terms of application in the conversion of RGB images to low density color standards such as CMYK newsprint, demonstrating acceptable color reproduction with reduced loss of shadow detail. However, the invention may be applicable to conversion from a smaller gamut to a larger gamut or a larger gamut to a smaller gamut.

ICC profiles ordinarily specify how white points are matched to one another when conversions take place, but do not provide guidance for matching of black points. Black point compensation (BPC) is a technique that can be used in conjunction with relative colorimetric conversions of images to perform gamut mapping. A BPC technique ordinarily involves adjusting the black scaling of colorimetric values in XYZ or linear RGB space in order to map the black point of one system, such as RGB, to that of another system, such as CMYK. An example of a mapping for which BPC may be applied is a mapping from the AdobeRGB gamut to a newsprint CMYK gamut.

The tonal range of an image is determined by the number of intermediate gray values between the white point and black point of the image. The white point generally refers to the brightest white reproducible by an imaging device. The black point generally refers to the darkest black reproducible by an imaging device. Black point matching techniques evaluate source and destination black points and apply corrections to avoid undesirable visual effects. Black point matching is important because the human eye tends to be more sensitive to changes in the shadow tones, i.e., saturated tones, than changes in the highlight tones, i.e., desaturated tones.

In some instances, conventional perceptual rendering can be unacceptable for converting RGB images to SNAP CMYK. Images containing shadow detail, such as photographs of black smoke from an outdoor fire, black clothing, or the like, can suffer from a significant loss of shadow tone detail in converting from RGB to CMYK. Analysis performed visually in the Adobe Photoshop application, mathematically using plots in Microsoft Excel, and graphically by viewing three-dimensional gamuts in the Apple ColorSync utility, reveal an explanation for this problem.

By placing an emphasis on preserving both saturation and shadow detail, however, it is possible to converge quickly to a reasonable and logical modification of current BPC techniques in order to achieve significantly improved color fidelity. As will be described, the modification can be evaluated by applying a modified BPC technique, in accordance with the invention. The modified BPC technique may be applied in the form of creating an A2B (A to B) table in an ICC profile, which can be viewed with the three-dimensional gamut viewer of the Apple ColorSync application, as well as used to convert images from RGB to CMYK using a color management module (CMM), such as the KPG color fidelity module (CFM) commercially available from Kodak Polychrome Graphics, LLC of Norwalk, Conn., set to maximum gray component replacement (GCR) with relative rendering.

The objective of gamut mapping in general is to map saturated and dark colors from one gamut to another in such a manner as to preserve detail, i.e., via tone compression, in the dark and saturated regions while at the same time avoiding unnecessary desaturation of midtone and highlight colors. Tone generally refers to the luminance value at a point within the range of color values reproducible by an imaging device. For these reasons, BPC techniques are used in some CMMs, and are being proposed as a baseline gamut mapping method by the ICC. One assumption underlying conventional BPC techniques is that because BPC occurs in essentially a linear RGB space, undesired hue shifts can be avoided and most compression will occur in the shadows with little effect on the mid tone and highlight tone areas.

This assumption is generally correct. Indeed, when adjusting colorimetric values from lower to higher saturation, BPC ordinarily provides acceptable results because dark colors display a dramatic increase in contrast and apparent density with little impact on the less dark and saturated regions. This effect is experienced noticeably for virtual proofing on a display device where the effect of flare and imperfect RGB=0 is corrected via BPC in the display profile. Because a slight increase is added to RGB=0 in linear space, it is possible to achieve the high contrast and appearance of dense black and near black colors.

Unfortunately, the inverse is also true. Specifically, when mapping from a higher density, higher saturation gamut such as RGB working spaces (e.g., sRGB, AdobeRGB, or the like) to a lower density, lower saturation gamut such as SNAP (i.e., newsprint), shadow detail is dramatically reduced in proportion to the mid tones and highlight tones. Thus, images of black smoke, for example, proceed to lose substantial shadow detail. This issue may not be apparent until an attempt is made to perform conversions between extremely different gamuts such as the AdobeRGB gamut and the SNAP gamut.

The problem can be demonstrated mathematically in an Excel plot by performing the steps set forth below. In the following steps, all references to RGB assume normalizing to the RGB of paper base before and after BPC is performed. First, conversion from the Commission Internationale de l'Éclairage L* (CIELAB) color space to CIE luminosity Y, then from Y to $Y_{BPC}$, i.e., Y with black point compensation (BPC), then from $Y_{BPC}$ to CIE L*corr (L*->Y->$Y_{BPC}$->L*$_{corr}$), is simulated as follows:

$$L^* \rightarrow Y \rightarrow Y_{BPC} \rightarrow L^*_{corr} \quad (1)$$

$$Y = ((L^* + 16)/116)^3 \quad \text{for } L^* > \text{or} = 8$$

$$Y = L^* \times 27/24389 \quad \text{for } L^* < 8$$

$$Y_{BPC} = (Y - BPC)/(1 - BPC)$$

$$L^*_{corr} = 116 Y_{BPC}^{(1/3)} - 16 \quad \text{for } Y_{BPC} > \text{or} = 216/24389$$

$$L^*_{corr} = Y_{BPC} \times 24389/27 \quad \text{for } Y_{BPC} < 216/24389$$

where $L^*_{Corr}$ represents the corrected luminance value produced by black point compensation via tone compression, $L^*$ represents the original luminance value of a given color value, and BPC is a fixed value representing the offset correction applied for the particular luminance value, i.e., the amount of gray to be added to or subtracted from the luminance value. As an example, the fixed BPC value could be in a range of approximately 0.0 to 0.06.

The inverse function of equation (1) above indicates the impact of converting from an RGB space to a BPC-corrected destination as follows:

$$Y_{Corr} = ((L^*_{Corr} + 16)/116)^3 \quad \text{for } L^*_{Corr} > \text{or} = 8 \quad (2)$$

$$Y_{Corr} = L^*_{Corr} \times 27/24389 \quad \text{for } L^*_{Corr} < 8$$

$$Y = (1 - BPC) Y_{BPC} + BPC$$

$$L^* = 116 Y^{(1/3)} - 16 \quad \text{for } Y > \text{or} = 216/24389$$

$$L^*_{Corr} = Y \times 24389/27 \quad \text{for } Y < 216/24389$$

Figure 1B:
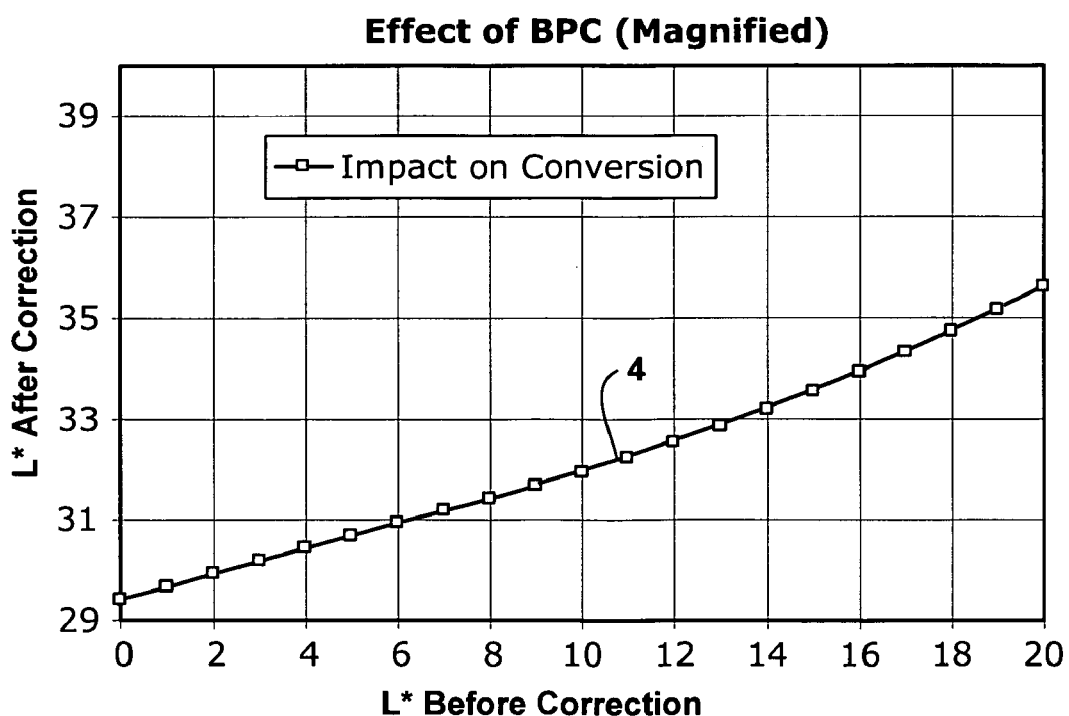
FIG. 1B is an enlarged version of a portion of the graph of FIG. 1A.

The above conversions (1) and (2), when plotted as L* corrected for the profile versus L* impact on converted images from RGB, are illustrated in FIGS. 1A and 1B, described below.

FIG. 1A is a graph illustrating the effect of a conventional BPC technique on mapping of source device color values to destination device color values. FIG. 1B is an enlarged version of a portion of the graph of FIG. 1A. FIG. 1A plots L* after correction (vertical axis) versus L* before correction (horizontal axis). Curve 2 illustrates the BPC correction to the profile for a source device, while curve 4 illustrates the impact of the BPC technique on the conversion. As can be seen in FIG. 1A, when conventional BPC is applied, significant compression occurs in the quarter tone to shadow tone end of the tone scale, e.g., from approximately L*=0 to L*=20. FIG. 1A provides a magnified view of the compression curve 4 from L*=0 to L*=20. As can be seen, the slope of L*$_{corr}$(L*) in this region is compressed from a value of approximately 1 to a value of approximately 3/10.

Figure 2:
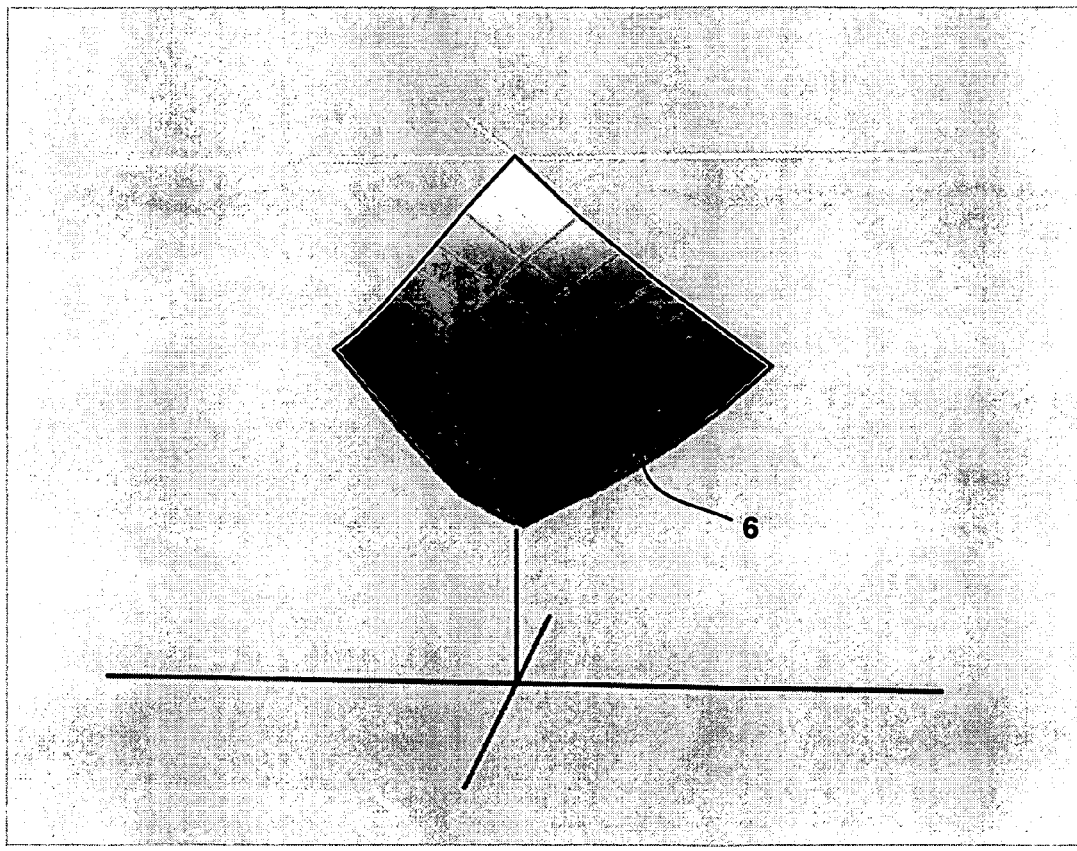
FIG. 2 is a graph illustrating an original perceptual gamut prior to application of a conventional BPC technique as shown in FIG. 1A.
Figure 3:
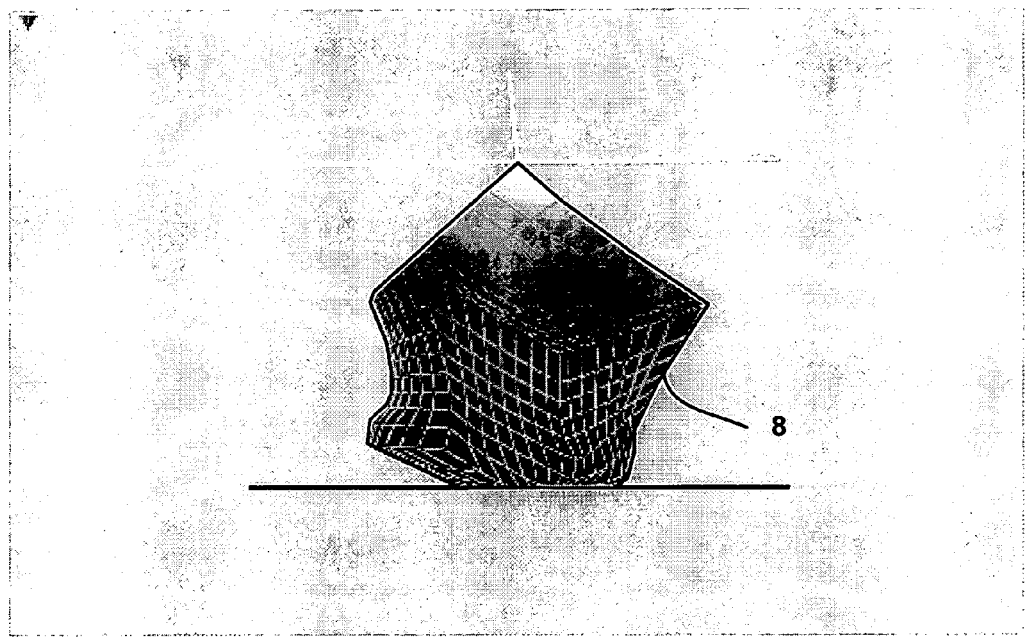
FIG. 3 is a graph illustrating the perceptual gamut of FIG. 2 after application of the conventional BPC technique of FIG. 1A.

FIG. 2 is a graph illustrating an original perceptual gamut prior to application of a conventional BPC technique as shown in FIG. 1A. FIG. 3 is a graph illustrating the perceptual gamut of FIG. 2 after application of the conventional BPC technique of FIG. 1A. FIGS. 2 and 3 illustrate the gamut within a three-dimensional RGB color space. The problem can be viewed graphically by opening a Specifications for Newsprint Advertising Production (SNAP) profile and viewing with the Apple ColorSync utility with the Kodak Polychrome Graphics Color Fidelity Module (KPG CFM) set as default color management module (CMM) and selecting the A2B0 (A to B0) (perceptual) tag. The original SNAP gamut 6 can be viewed as shown in FIG. 2. The Perceptual gamut with a PerBPC=2 shows significant distortion in the dark regions and can be viewed as shown by gamut 8 in FIG. 3. The distortion shown in FIG. 3 is unacceptable for many applications, resulting in significant loss of detail in the shadow regions.

In accordance with the invention, a modified BPC technique is designed to limit loss of detail in the highlight and shadow regions while providing tone compression that increases gradually in the full range of tones including the highlight tones and shadow tones. The desirable effects of the modified BPC technique can be observed when mapping from the RGB=0 of an RGB image to the L*=35 black of a SNAP image. However, the modified BPC technique may support a more generalized gamut mapping solution that will work well under all situations.

The modified BPC technique, in accordance with an embodiment of the invention, applies a nonlinear tone compression mapping. The nonlinear tone compression mapping may include application of a black point correction offset to device-independent color values corresponding to a first range of tones, e.g., shadow tones, applying a tone compression mapping with a slope of approximately one to device-independent color values corresponding to a second range of tones, e.g., highlight tones, and applying a varying tone compression mapping to device-independent color values corresponding to the full range of tones including the shadow tones, highlight tones, and midtones.

A nonlinear tone compression mapping in accordance with an embodiment of the invention may have the following characteristics:

1. Tone compression should increase gradually from highlight tones to shadow tones and from desaturated to saturated colors.

2. Highlight colors should experience minimal correction as RGB approaches a maximum value (e.g., 255 in an 8-bit color system) or as CMYK approaches a minimum value, i.e., zero.

3. The above requirements 1 and 2 should assume a reasonably perceptual RGB space, e.g., where gamma of the RGB space is in the range of approximately 1.5 to 3.0.

Translating the first requirement into mathematical terms, the rate of change of the derivative of the BPC function, i.e., the second derivative, should be substantially constant across the full range of tones, which means the correction function generally should be of the form:

$$\frac{d^2 f(x)}{dx^2} = a \quad (3)$$

$$f(x) = ax^2/2 + bx + c$$

where x represents the original source device color input value, e.g., intensity, to be compensated, and a, b and c are coefficients. Equation (3) above implies that the correction function should be no higher than a second order polynomial.

If it is assumed that the offset "c" in equation (3) above should be equated with the BPC offset, then the following boundary conditions are produced:

$$f(0) = BPC \quad (4)$$

$$f(1)=1 \quad (5)$$

which implies the following expression:

$$f(x)=BPC+(1-BPC)x+\alpha x(1-x) \quad (6)$$

where BPC is a fixed offset value. The second characteristic of the tone compression mapping implies that the correction parameter α can be defined in terms of BPC, since it implies that the first order derivative of f(x) must be 1 for x=1:

$$\frac{df(x)}{dx}=(1-BPC)+\alpha-2\alpha x=1 \quad (7)$$

$$\alpha=-BPC$$

Thus, a BPC correction expression according to the modified BPC technique of the invention may be expressed as follows:

$$f(x)=BPC+(1-BPC)x-BPCx(1-x)$$

$$f(x)=BPCx^2+(1-2BPC)x+BPC \quad (8)$$

Hence, the modified BPC technique may be characterized by a quadratic expression providing a slope of approximately one for highlight tones, a fixed BPC offset for shadow tones, and a smooth quadratic increase of BPC correction ranging from white to gray to black, i.e., over the full range of tones including shadow tones, highlight tones and midtones.

Finally, the third characteristic of the tone compression mapping implies that rather than simply converting CIELAB to XYZ, applying BPC, and converting back to CIELAB, or to convert CIELAB to XYZ, converting XYZ to RGB, RGB to RGB with BPC, RGB with BPC to XYZ, and XYZ to CIELAB (CIELAB->XYZ->RGB->RGB(BPC)->XYZ->CIELAB), which applies the BPC in linear RGB space, the correction should be applied to an RGB space that is visually similar to CIELAB. This can be accomplished by mapping RGB(linear) to RGB' (perceptual) and then RGB' (perceptual) to RGB (linear) as follows:

$$R'=R^{1/2.2}, G'=G^{1/2.2}, B'=B^{1/2.2} \quad (9)$$

and $$R=R'^{2.2}, G=G'^{2.2}, B=B'^{2.2} \quad (10)$$

In equation (9), for purposes of example, the exponents are 1/2.2. In equation (10), the exponents are 2.2. Since CIELAB currently is defined using two piecewise functions, i.e., a linear function for X, Y, or Z approaching zero, and otherwise a non-linear power law, a more elaborate definition of RGB->(RGB)' can be used, such as that defined in the specification for the sRGB color space or the specification for the Kodak ProPhotoRGB color space. An example is to use a definition of perceptually linear (RGB)' that is identical in response to that of CIELAB L* as follows:

$$R'=f(R), G'=f(G), B'=f(B)$$

where $$f(R)=1.16R^{1/3}-0.16 \text{ for } R \geq 216/24389$$

$$f(R)=24389*R/2700 \text{ for } R<216/24389$$

and $$R=f^{-1}(R'), G=f^{-1}(G'), B=f^{-1}(B')$$

where $$f^{-1}(R)=((R'+0.16)/1.16)^3 \text{ for } R' > \text{ or } =0.08$$

$$f^{-1}(R)=R'*2700/24389 \text{ for } R'<0.08$$

and similarly for G and B. The modified BPC correction is applied to RGB' rather than RGB (linear) as follows:

CIELAB->XYZ->RGB->RGB'->RGB'(BPC)->RGB->XYZ->CIELAB (11)

where RGB' (BPC) indicates the application of the BPC correction in the perceptual RGB' color space.

According to an alternative embodiment, the inverse of the above correction can be made to the destination device profile, rather than the source device profile, which implies the following BPC equation:

$$f^{-1}(x)=\frac{-(1-2BPC)+\sqrt{(1-2BPC)^2-4BPC(BPC-x)}}{2BPC} \quad (12)$$

The above expression (12) has the impact of mapping the black point of a small gamut to a perfect black and increasing the gamut volume. This technique relies on the assumption that if two gamuts (A and B) are being mapped from A->B, either or both would be mapped to a perfect black if either or both had non-zero black points, e.g., when mapping SWOP (CMYK)->SNAP (CMYK). Although in theory the result should be similar to the procedure described above for the case of mapping RGB->CMYK, in practice this approach can exaggerate the deficiencies and non-linearities of low quality printing such as SNAP newsprint. Accordingly, it has been found that better results can be achieved by applying equation (8) to the larger gamut. Application of equation (8) has the effect of increasing the black point of the larger gamut system and shrinking the gamut volume until the gamuts of A and B are similar.

Figure 4A:
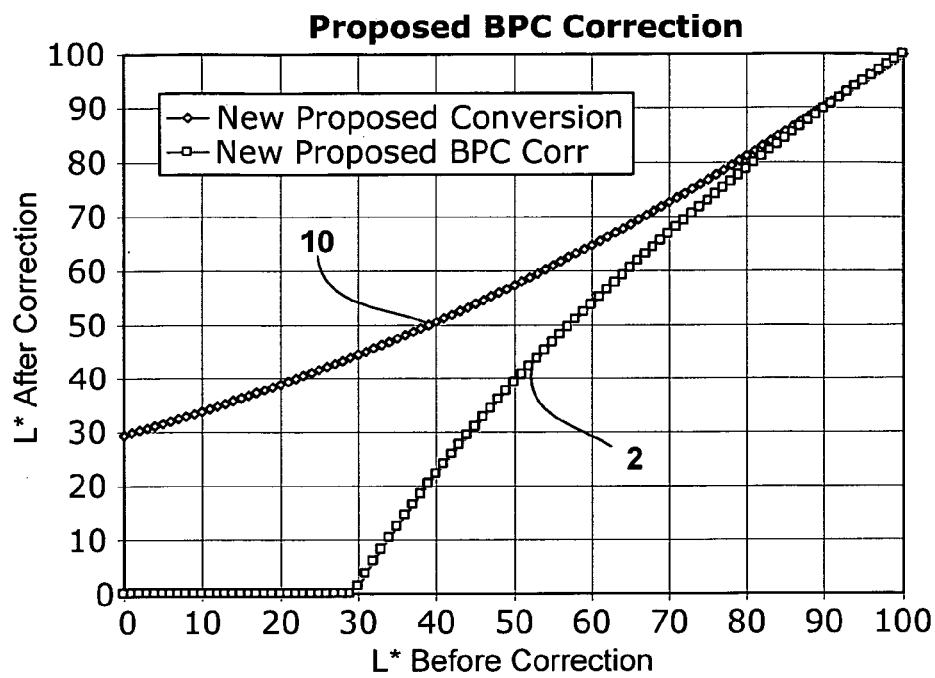
FIG. 4A is a graph illustrating the effect of a modified BPC technique on mapping of source device color values to destination device color values in accordance with an embodiment of the invention.
Figure 4B:
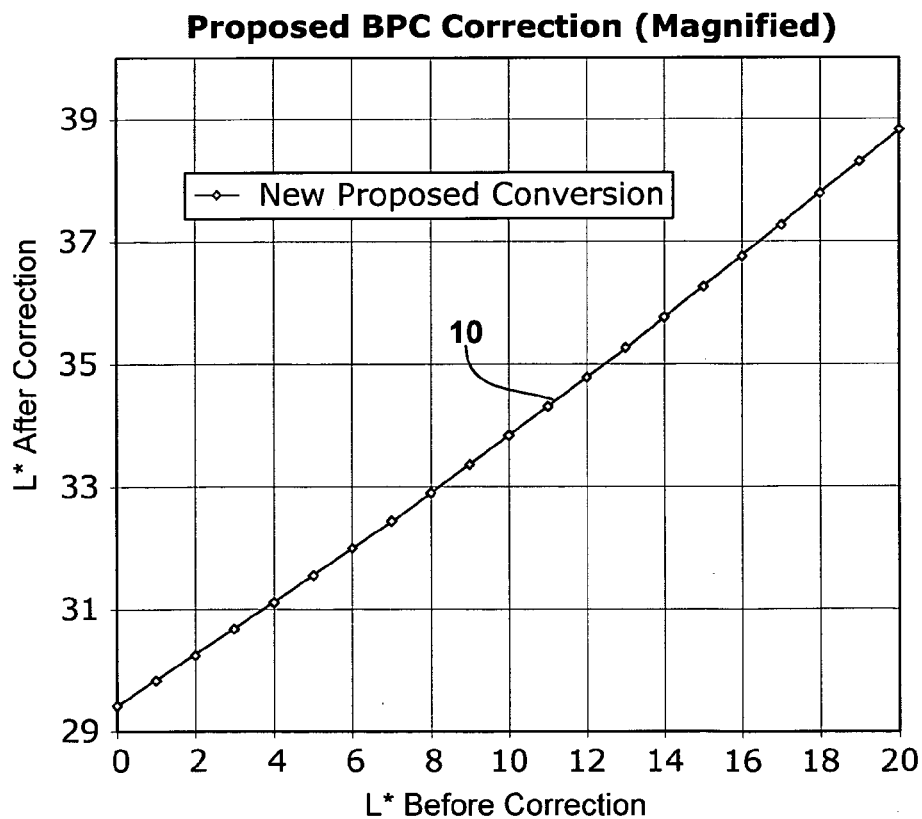
FIG. 4B is an enlarged version of a portion of the graph of FIG. 4A.

FIG. 4A is a graph illustrating the effect of a modified BPC technique on mapping of source device color values to destination device color values in accordance with an embodiment of the invention. More particularly, FIG. 4A represents the implementation of the modified BPC technique according to equation (8) on a conversion from RGB to CMYK. Curve 10 in FIG. 4A illustrates the impact of the modified BPC technique on the conversion. In particular, curve 10 shows less compression in the shadow tone to quarter tone range, e.g., L*=0 to 20. FIG. 4B provides a magnified view of this conversion in the range of L*=0 to L*=20. As shown in FIG. 4B, the slope in the L*=- to L*=20 range is closer to ½ (0.5), as compared to the slope of approximately 3/10 (0.3) in the conventional BPC method shown in FIG. 1B above.

Figure 5:
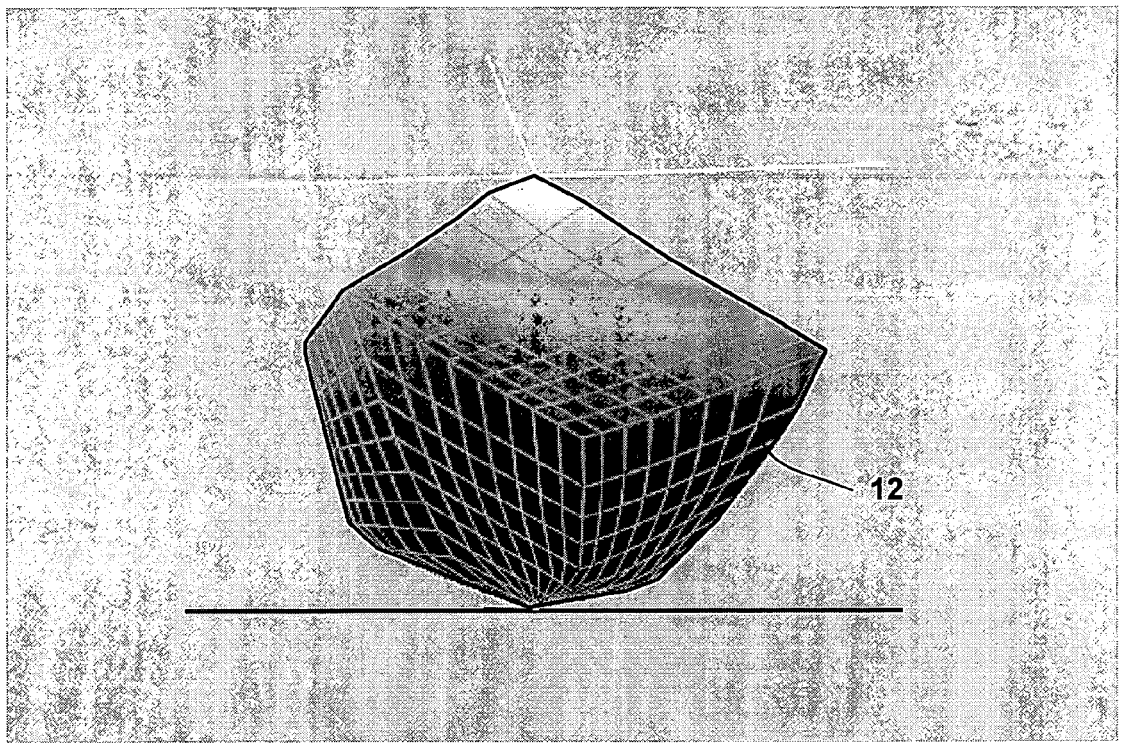
FIG. 5 is a graph illustrating the perceptual gamut of FIG. 2 after application of a modified BPC technique in accordance with an embodiment of the invention.

FIG. 5 is a graph illustrating the perceptual gamut of FIG. 2 after conversion using a modified BPC technique according to equation (8). The converted perceptual gamut 12 in FIG. 5 has reduced distortion in the dark regions relative to the gamut 8 in FIG. 3. The distortion shown in FIG. 3 can be unacceptable for many applications, resulting in significant loss of detail in the shadow regions.

Although a preferred embodiment of the invention may require shrinking the larger gamut to match the smaller gamut, the improved gamut enlargement shown in FIG. 5 occurs using the more visually uniform RGB space. The reasonable shape of the gamut 12 is indicative of the superiority of this approach over conventional BPC techniques.

Notably, when performing BPC, the value of the black point can be calculated as follows:

$$L*(\text{Black Point}) \to XYZ(\text{Black Point}) \to RGB(\text{Black Point}) \to RGB'(\text{Black Point}) \quad (13)$$

Expression (13) requires that the RGB black point value is converted to a visually uniform RGB' space before performing the BPC correction defined above. Also, because RGB is assumed to be media white-normalized, BPC can optionally be a neutral adjustment, i.e., as follows:

$$BPC = \text{minimum}(R(\text{black pt}), G(\text{black pt}), B(\text{black pt})), \quad (14)$$

i.e., where the BPC value is the same value for R', G' and B' correction. In other words, the BPC offset correction is the same for each color channel, and is selected based on the minimum blackpoint (black pt) among the color channels R, G, B. Hence, it is possible that the selected blackpoint may be non-neutral depending on balance among the R, G, and B channels.

The choice of the RGB color space for the conversion is important. A common RGB space is AdobeRGB. Color edits and manipulations are often performed on RGB images using AdobeRGB as a default. Meanwhile, for chromatic adaptation either by itself or in conjunction with BPC, a Bradford transform is often used, e.g., as described in the section on chromatic adaptation in ICC Specification, Version 4.2.0.0 (Specification ICC.1:2004-10 (Profile version 4.2.0.0). Transforms used for chromatic adaptation are similar in concept. For example, they ordinarily are used to convert XYZ values to LMS (long, medium, short) values in order to better capture the physical "RGB-like" properties of the eye. Thus, the Bradford transform and other "cone sharpening" matrices can be simply regarded as inverse RGB matrices used for RGB working spaces such as AdobeRGB.

Although either inverse Bradford or AdobeRGB conversions could be used for the modified BPC gamut mapping procedure described in this disclosure, there exist physically valid colors that are outside either of the gamuts of these two RGB spaces. Consequently, negative values of RGB or LMS can occur when converting XYZ->LMS. Negative values of LMS are problematic, especially for non-linear conversions. To avoid this problem, a new RGB space is proposed in this disclosure, which can be referred to as "EdgeRGB" for clarity. The proposed EdgeRGB color space is designed to contain all valid XYZ values, including the locus of the well known CIE "horseshoe" diagram, which is comprised of single wavelength colors ranging from 360 to 760 nm.

Figure 6:
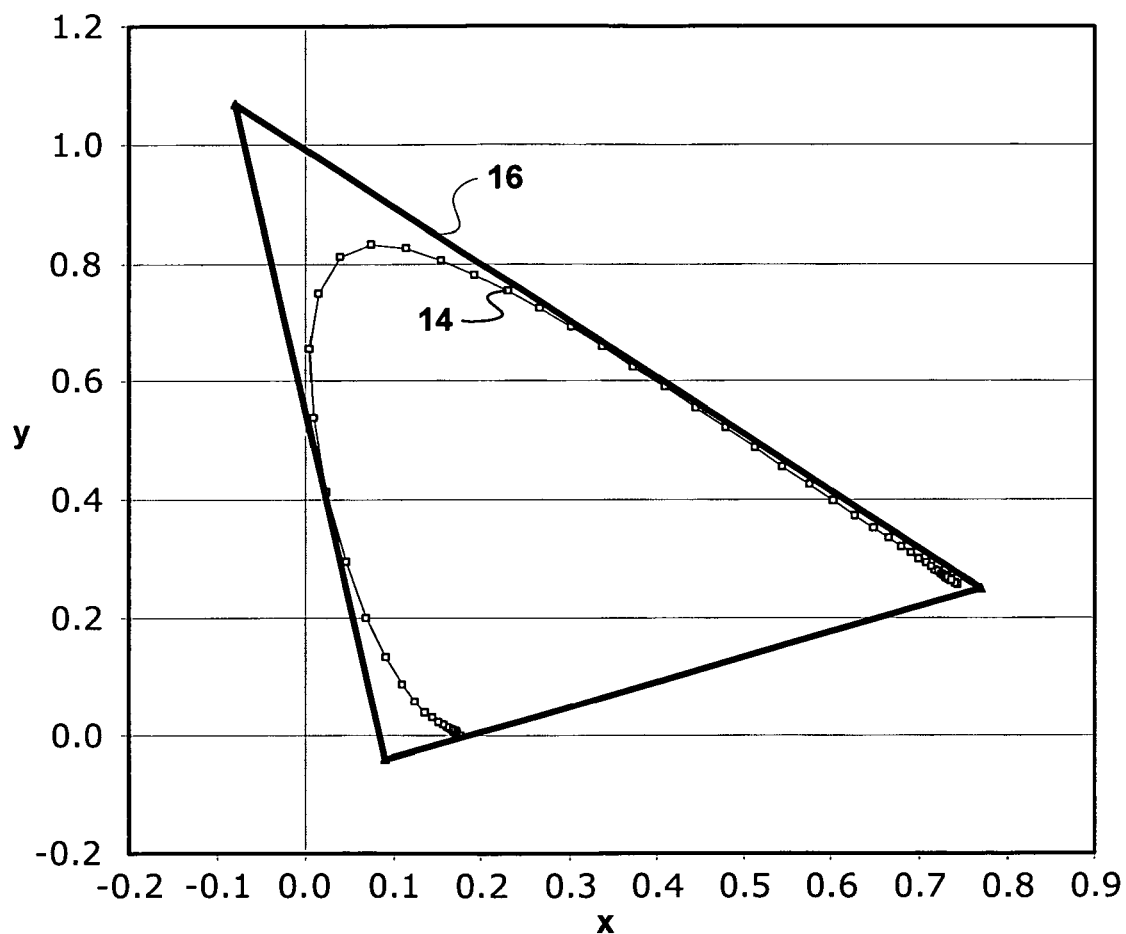
FIG. 6 is a graph illustrating a modified RGB space for use with a modified BPC technique in accordance with an embodiment of the invention.

FIG. 6 is a graph illustrating the modified EdgeRGB space for use with a modified BPC technique in accordance with an embodiment of the invention. In particular, FIG. 6 is a CIE chromaticity map diagram in x-y coordinates. In FIG. 6, curve 14 shows the locus of the CIE "horseshoe diagram," known to those skilled in the art of color imaging, comprising single wavelength colors ranging from 36 nm to 760 nm. The horseshoe defines a spectral energy locus of colors. Curve 16 defines the modified EdgeRGB color space. The EdgeRGB color space (as defined by curve 16) shown in FIG. 6 can be defined with a D50 white point and with chromaticities for RGB->XYZ. The inverse can be calculated for use as the "LMS" space similar to the Bradford transform, i.e., XYZ->RGB (or LMS). By using this approach, all legal values of XYZ will result in positive values of LMS in order to permit the non-linear conversions described in this disclosure to be performed.

The EdgeRGB color space (as defined by curve 16) is useful for color scaling as described herein, and may have the following characteristics, as shown in FIG. 6. First, the EdgeRGB color space encloses the entire CIE locus 14, i.e., all visible colors. Second, the EdgeRGB color space generally preserves the symmetry of the CIE locus 14. Third, the EdgeRGB color space is large enough to contain the CIE locus 14, but sized sufficiently small such that it tangentially intersects at least some points on the CIE locus. In general, the EdgeRGB color space is useful in application of a nonlinear tone compression mapping for modified BPC in accordance with this disclosure.

In order to perform RGB-like manipulations, it is desirable to have a large RGB space that just captures the entire CIE locus. The EdgeRGB gamut triangle accomplishes this objective with a D50 white point. The Bradford RGB gamut, in contrast, has a very negative shifted value for the green chromaticity, and can give negative RGB values. The EdgeRGB space may have a gamma value of 1.8 and be combined with a quadratic black point correction to provide desirable highlight and mid tone preservation in the case of moderate to severe gamut mapping compression.

Figure 7:
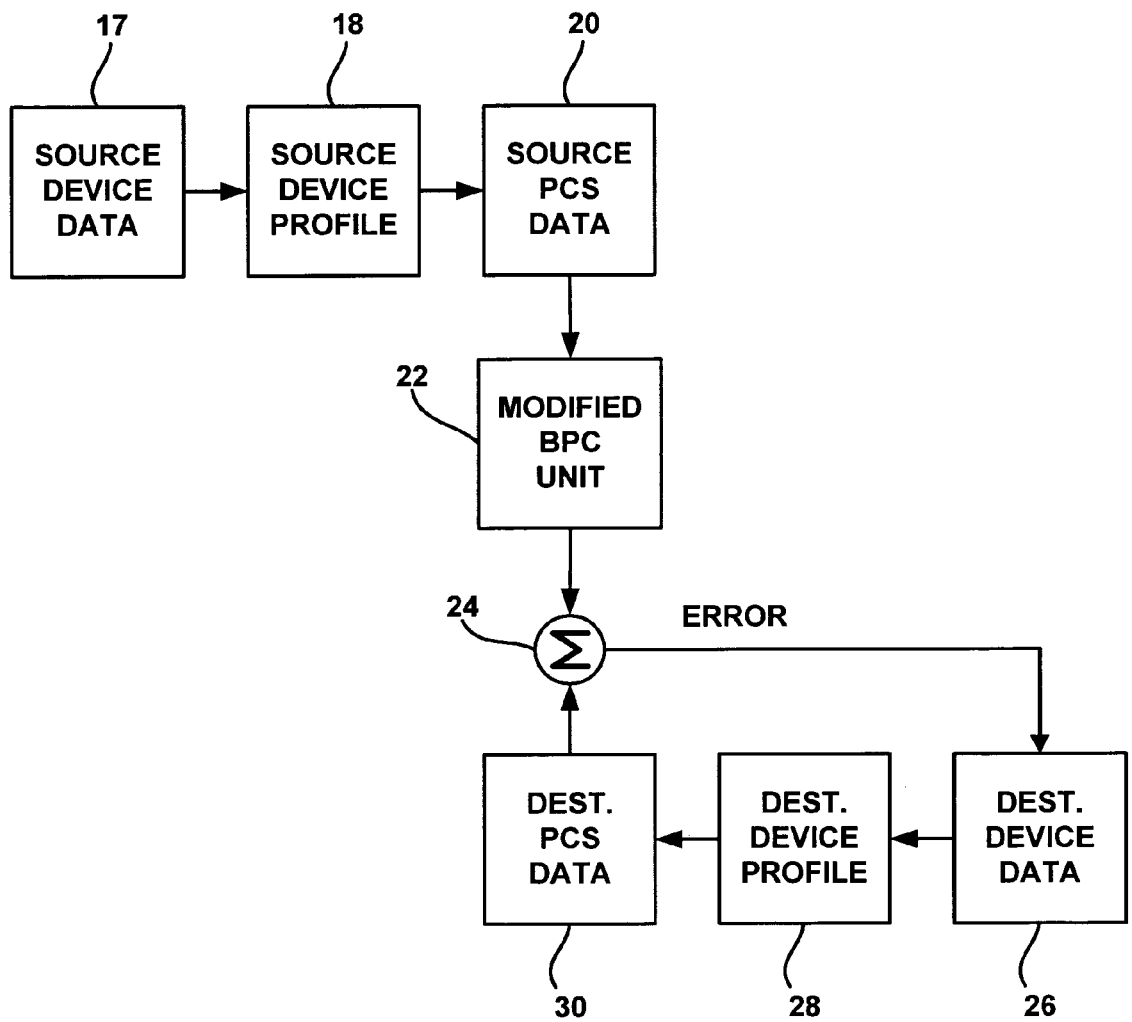
FIG. 7 is a flow diagram illustrating mapping of color values from a source device to color values of a destination device using a modified black point compensation unit in accordance with the invention.

FIG. 7 is a flow diagram illustrating mapping of color values from a source device to color values of a destination device using a modified black point compensation unit in accordance with the invention. As will be described in greater detail, the mapping process may be implemented as a software process performed by a processor in a general purpose computing system. As shown in FIG. 7, the processor obtains an image file containing source device data 17 that is formulated for presentation on a source imaging device, such as a printer or display device, from a storage archive. The source device data may be RGB data. To convert the image file, the processor applies a source device profile 18 to convert the source device data 17 to source profile connection space (PCS) data 20, i.e., by a forward transformation. The PCS may be XYZ, L*a*b*, Luv, or any other tri-component color space suitable for application of conversion mapping between source and destination device-dependent coordinates.

With further reference to FIG. 7, a modified black BPC unit 22, also implemented within a processor of a general purpose computing system, applies black point compensation to source PCS data 20 according to an embodiment of the modified BPC techniques described in this disclosure. For example, modified BPC unit 22 applies a nonlinear tone compression mapping to achieve a desirable BPC result. The processor applies an error minimization unit 24 to search for destination device-dependent coordinates defined by destination device data 26. The destination device data may be CMYK data. The processor converts the destination device data 26, using a destination device profile 28, to produce destination PCS data 30, i.e., by a forward transform. Error minimization unit 24 compares the destination PCS data 26 to the source PCS data 20, as modified by modified BPC unit 22, to produce an error value ("ERROR"). The processor then iteratively modifies the destination device data 26 until the difference between the source PCS data 20 and the destination PCS data 30 produces an acceptably small error value.

Figure 8:
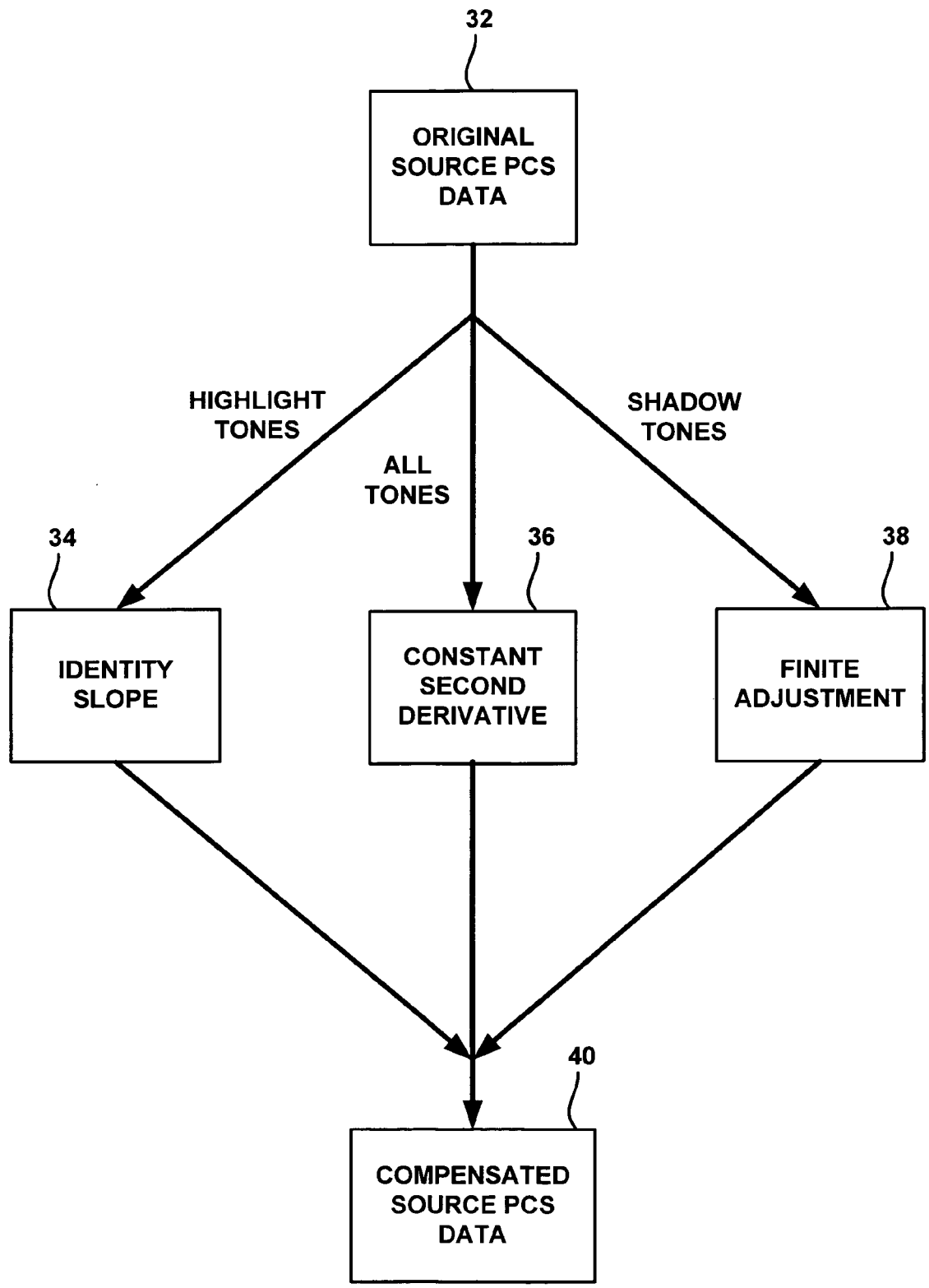
FIG. 8 is a block diagram illustrating modified BPC mapping of highlight and shadow regions in accordance with an embodiment of the invention.

FIG. 8 is a block diagram illustrating modified BPC mapping of highlight and shadow regions in accordance with an embodiment of the invention. FIG. 8 illustrates exemplary functionality of BPC unit 22 of FIG. 7, in accordance with the modified BPC technique described in this disclosure. As shown in FIG. 8, the nonlinear tone compression mapping has the effect of applying a different BPC conversion to original source PCS data 32 depending on whether the source PCS data is in the highlight tones or shadow tones. Specifically, consistent with requirements 1, 2 and 3, described previously, and equation (8), the BPC equation produces an average slope nearly equal to one, i.e., an identity slope 34, for the highlight tones, a substantially constant second derivative 36 throughout the entire tone scale including the highlight tones and shadow tones, and a finite adjustment 38 to the shadow tones. The result is a set of black point compensated source PCS data 40.

In general, the highlight tones may refer to tones in the range of approximately 0% to 25% intensity, and the shadow tones may refer to tones in the range of approximately 75% to 100% intensity. The bounds of the highlight tone and shadow tone ranges are exemplary, but serve to illustrate the general range of tones impacted by the modified BPC equation. Also, the bounds of the range may overlap. Application of a BPC function with an identity slope 34 in the highlight tones, a substantially constant second derivative 36 throughout the tone scale, e.g., from 0 to 100%, and a finite adjustment 38 (e.g., BPC offset) to the shadow tones can produce a well-distributed tone compression so that substantial loss of detail in highlight and shadow tones can be reduced.

Figure 9:
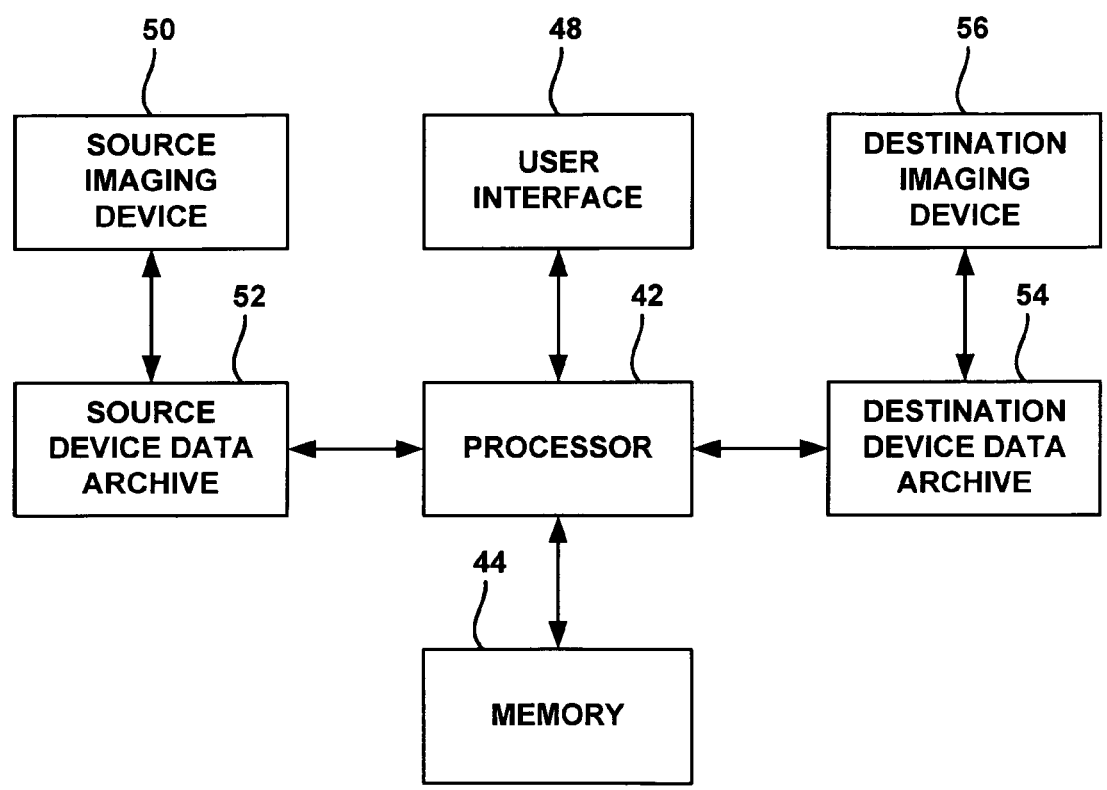
FIG. 9 is a block diagram illustrating an exemplary operating environment for application of a modified BPC mapping technique in accordance with an embodiment of the invention.

FIG. 9 is a block diagram illustrating an exemplary operating environment for application of a modified BPC mapping technique in accordance with an embodiment of the invention. In particular, FIG. 9 shows a general purpose computing environment comprising a processor 42, memory 44, user interface 48, source imaging device 50, source device data archive 52, destination device data archive 54 and destination imaging device 56. Processor 42 may execute a color management module, such as the KPG CFM, for conversion of source device data to destination device data. Processor 42 further executes a modified BPC technique during the conversion to alleviate distortion and loss of detail, e.g., when converting from a larger gamut such as AdobeRGB to a much smaller gamut such as SNAP.

Source imaging device 50 and destination imaging device 56 may be display devices or printers. Alternatively, source imaging device 50 may be an image capture device such as a scanner or camera. In either case, source imaging device 50 and destination imaging device 56 operate according to an applicable set of device-dependent coordinates. As an example, source imaging device 50 may be an image capture device that produces source device data defined by RGB coordinates, while destination imaging device 56 may be a printer that produces destination device data defined by CMYK coordinates. Archives 52 and 54 store the source and destination device data, and may reside within a common data storage device, such as a hard drive.

User interface 48 may include a display device, such as a cathode ray tube (CRT), liquid crystal display (LCD), plasma display, digital light processing (DLP) display, or the like, for presentation of output to a user. In addition, user interface 48 may include a keyboard and pointing device, such as a mouse, trackball or the like to support a graphical user interface. In operation, a user interacts with processor 42 via user interface 48 to direct conversion of source device data to destination device data, e.g., as shown in FIGS. 7 and 8. Memory 44 stores process-readable instructions and data for execution by processor 42 to implement the modified BPC techniques described in this disclosure. The instructions include program code that implements the color mapping and BPC functionality described herein. Processor 42 may operate in any of a variety of operating systems, such as Windows, Mac OS, Linux, Unix, or the like.

Processor 42 may take the form of one or more general purpose microprocessors, e.g., within a PC or MAC computer or workstation. In some embodiments, processor 42 alternatively may be implemented by one or more digital signal processors (DSPs), application specific integrated circuits (ASICs), field programmable logic arrays (FPGAs), or any equivalent integrated or discrete logic circuitry, or any combination thereof. Memory 44 may include or utilize magnetic or optical tape or disks, solid state volatile or non-volatile memory, including random access memory (RAM), read only memory (ROM), electronically programmable memory (EPROM or EEPROM), or flash memory, as well as other volatile or non-volatile memory or data storage media.

The modified BPC techniques described herein may be implemented as programmable functionality of processor 42 of FIG. 9. This functionality may be characterized by its impact on different areas of the tone curve. For example, the modified BPC technique applies a BPC function that applies a nonlinear tone compression mapping to convert color values in a first gamut to color values in a second gamut. The non-linear tone compression mapping may have a slope of approximately one for the highlight tones (e.g., 0% to 25%), a substantially constant second derivative throughout the entire tone scale (0% to 100%), and a finite adjustment to the shadow tones (e.g., approximately 75% to 100%). The finite adjustment may be a fixed BPC offset that is applied to each of the color values in the shadow tone range. Although the modified BPC technique impacts the highlight and shadow tones differently, it can be implemented by application of a single mathematical BPC function that produces the different BPC results in the highlight tone and shadow tone regions. Alternatively, the BPC function may be implemented by a spline built automatically or manually based on user preference.

In some embodiments, the BPC function may be implemented by one or more lookup tables (LUTs) with BPC values indexed to particular color input values. The LUTs may be stand-alone LUTs for retrieval by processor 42 or built into a profile. In either case, the BPC values in the LUT represent adjustments to be applied to color values that fall within the different regions, i.e., highlight tone and shadow tone, according to the BPC function. Accordingly, the modified BPC techniques may be applied as a mathematical function or spline that is computed by processor 42 to produce BPC adjustments, or as a set of precomputed indexed LUT entries that represent the BPC adjustments that would be output by the mathematical function in response to particular color input values.

Set forth below is a set of software code illustrating an exemplary process for modified BPC in accordance with an embodiment of the invention. Within the calculation normally used to perform a Bradford transform, the following code example can be used. In the example code below, discussion following a "//" character denotes comments concerning the operations carried out in the code. In this test case, a simple gamma curve with gamma=1.8 has been used to define the perceptual RGB space. As indicated above, more complex piecewise RGB tone curves can also be used. In the example below, standard C++ math library functions are used such as $x^n=\text{pow}(x,n)$.

```
#defineEDGE_TRANSFORM
#ifndefEDGE_TRANSFORM
  static const double kBradfordMatrix[9] = {0.8951, 0.2664, −0.1614,
                                            −0.7502, 1.7135, 0.0367,
                                            0.0389, −0.0685, 1.0296 };
#endif
//In order to perform RGB-like manipulations, a large RGB space that just
captures
//the entire CIE locus is desirable. The EdgeRGB gamut triangle (e.g.,
triangle 16 in FIG. 6)//does this with a D50 white point.
```

-continued

```
#ifdef EDGE_TRANSFORM
static const double kBradfordMatrix[9] = {1.037, 0.07842, −0.09494,
                                         −0.4311, 1.3356, 0.0971,
                                         0.0335, −0.00855, 1.1835 };
#endif
//The EdgeRGB gamma value of 1.8, as indicated below, combined
with a quadratic //black point correction for optimal highlight and
mid tone preservation provides a //good result for severe gamut
mapping compression, and is acceptable for smaller //gamut
compressions
#define EDGE_GAMMA 1.8
//The step below ensures that pow( ) always is a slightly positive
floating point value
#define MIN_POW_VALUE 0.00001
void BradfordLab::initializeTransforms (void)
{
//mLMSKOffsetSize refers to the media LMS (long, medium, short)
blackpoint offset value
        double xyz[3],mLMSKOffsetSize;
        XYZ      xyzVal;
        //The steps below obtain the media black point offsets
        xyzVal = mediaBlack ( );
        //put mediaBlack into mKOffset
        xyzVal.get (mKOffset);
        //Get LMS value of mKOffset
        //This function multiplies matrix "mConeMatrix" times vector
"mKOffset"
        //returning new LMS vector mLMSKOffset
        matrixTimesVec (mLMSKOffset, mConeMatrix, mKOffset);
        //LMS for reference white
        xyzVal = referenceWhite ( );
        xyzVal.get (xyz);
        //This step converts the "XYZ" vector for D50 white to its LMS
counterpart
        //"mLMSRef" by multiplying by the Bradford cone matrix
"mConeMatrix"
        matrixTimesVec (mLMSRef, mConeMatrix, xyz);
        //LMS for media white
        xyzVal = mediaWhite ( );
        xyzVal.get (xyz);
        //This step converts the "XYZ" vector for media white (such as
paper white)
        //to its LMS counterpart "mLMSMedia" by multiplying by the
        Bradford cone
        //matrix "mConeMatrix"
        matrixTimesVec (mLMSMedia, mConeMatrix, xyz);
        //Define black point offset to be based on "M" only for LMS
        mLMSKOffsetSize = mLMSKOffset[1 ]/mLMSMedia[1];
        //Normalize mLMSKOffset to LMS media white
        if(mLMSKOffsetSize <MIN_POW_VALUE)
                mLMSKOffsetSize = MIN_POW_VALUE;
        mLMSKOffsetSize =
        pow(fmax(MIN_POW_VALUE,mLMSKOffsetSize),
1.0/EDGE_GAMMA);
        //Define the LMS black offset vector to be a neutral black point
correction
        //of magnitude mLMSKOffsetSize
        mLMSKOffset[0] = mLMSKOffsetSize;
        mLMSKOffset[1] = mLMSKOffsetSize;
        mLMSKOffset[2] = mLMSKOffsetSize;
        //mFwdScale defines the scaling to go from D50 white to media
        //white such as paper white
        mFwdScale[0] = mLMSRef[0]/ mLMSMedia[0];
        mFwdScale[1] = mLMSRef[1]/ mLMSMedia[1];
        mFwdScale[2] = mLMSRef[2]/ mLMSMedia[2];
}
        //Given the above code, the forward chromaticadaptation may be
carried out as
        //follows (forward means converting from non-D50 to reference D50
white point):
        void BradfordLab::forwardAdaptation (XYZ const& xyzIn_,XYZ&
result_) const
        {
                double lms[3], xyz1[3], xyz2[3], sgn,Y;
                xyzIn_.get (xyz1);
                memset (xyz2, 0, 3*sizeof(double));
                Y = (xyz1[1]> 0.0) ? 1xyz[1]: 0.0001; // ensure > 0.0
                //Convert from xyz values in to LMS by multiplying XYZ vector
by cone matrix
```

-continued

```
                //In this example, the cone matrix is inverse of EdgeRGB
                matrixTimesVec (lms, mConeMatrix, xyz1); // lms = M xyz
                //If lms values are outside of EdgeRGB gamut, assume this is a
non-physical Lab
                //value (like Lab = 100,100,100) requiring no adaptation and
perform no change
                if(lms[0]< −0.01 || lms[1]< −0.01 || lms[2] < −0.01)
                {
                        result_.set (xyz1);
                        return;
                }
                //Normalize LMS values to LMS media white -- this means
white LMS=(1, 1, 1)
                lms[0] /= mLMSMedia[0];
                lms[1] /= mLMSMedia[1];
                lms[2] /= mLMSMedia[2];
                //Convert LMS (rel) -> LMS' = (LMS)1/Edge_Gamma to
ensure reasonable
                //shadow preservation
                lms[0]=
pow(fmax(MIN_POW_VALUE,lms[0]), 1.0/EDGE_GAMMA);
                lms[1] =
pow(fmax(MIN_POW_VALUE,lms[1]),1.0/EDGE_GAMMA);
                lms[2] =
pow(fmax(MIN_POW_VALUE,lms[2]), 1.0/EDGE_GAMMA);
                //Convert LMS' -> LMS' (BPC) using quadratic expression for
BPC correction.
                //This expression ensures no change to values near white,
maximum BPC
                //correction for values near black, and smooth quadratic increase
of BPC correction
                //ranging from white to gray to black
                lms[0] = mLMSKOffset[0]*lms[0]*lms[0] + (1.0 −
2.0*mLMSKOffset[0])*lms[0]+mLMSKOffset[0];
                lms[1] = mLMSKOffset[1]*lms[1]*lms[1]+(1.0 −
2.0*mLMSKOffset[1])*lms[1 ]+mLMSKOffset[1];
                lms[2] = mLMSKOffset[2]*lms[2]*lms[2]+(1.0 −
2.0*mLMSKOffset[2])*lms[2]+mLMSKOffset[2];
                //Convert LMS' (BPC)->LMS (rel) using LMS(rel) =
(LMS)Edge_Gamma
                lms[0] = pow(fmax(MIN_POW_VALUE,lms[0]),
EDGE_GAMMA);
                lms[1] = pow(fmax(MIN_POW_VALUE,lms[l]),
EDGE_GAMMA);
                lms[2] = pow(fmax(MIN_POW_VALUE,lms[2]),
EDGE_GAMMA);
                //Scale LMS values to LMS ref white
                lms[0] *= mLMSRef[0];
                lms[1] *= mLMSRef[1];
                lms[2] *= mLMSRef[2];
                matrixTimesVec (xyz2, mConeInverse, lms); //xyz = M−1 lms
                xyz2[0] = fmax(0.0,xyz2[0]);
                xyz2[1] = fmax(0.0,xyz2[1]);
                xyz2[2] = fmax(0.0,xyz2[2]);
                result_.set (xyz2);
        }
When building the mapping from source to destination, the black point of
each gamut can be obtained and used to set the new black point of the
device with the larger gamut and/or darker black point, e.g., as indicated
by the following code:
                //Obtain the mapping black for each device. Determine which device
has lighter black
                //mapping value. Add the difference (appropriately scaled) to the
darker device to
                //lighten the black point and shrink the gamut via EdgeRGB
                //Black Point Compensation
                //Note that "mModels[ ]" is an array of model objects, i.e.
mathematical descriptions
                //of a source or destination device
                destMappingBlack = mModels[mNumModels-1]-
>getMappingBlack ( );
                for ( i=mNumModels-2 ; i>=0 ; i--
                {
                        sourceMappingBlack = mModels[i]->getMappingBlack ( );
                        diffMappingBlack = destMappingBlack -
sourceMappingBlack;
                        //If black of the destination device is lighter than the source
device,
                        //lighten the black point of the source device in order to shrink
```

-continued

```
the gamut
        //otherwise, shrink the gamut of the destination device
            if (diffMappingBlack.y( ) >= 0.0)
            {
                mModels[i]->setMappingBlack (diffMappingBlack/
                    (1.0-sourceMappingBlack.y( )));
                mModels[mNumModels-1]->setMappingBlack
(zeroBlack);
            }
            else
            {
                diffMappingBlack *=-1;
                mModels[mNumModels-1]->setMappingBlack
                    (diffMappingBlack/(1-destMappingBlack.y( )));
                mModels[i]->setMappingBlack (zeroBlack);
            }
        }
```

Various embodiments of the invention have been described. These and other embodiments are within the scope of the following claims.

PARTS LIST

2 Curve
4 Curve
6 Gamut
8 Gamut
10 Curve
12 Gamut Enlargement
14 Curve
16 Curve
17 Source Device Data
18 Source Device Profile
20 PCS Data
22 Modified BPC Unit
24 Error Minimization Unit
26 Destination Device Data
28 Destination Device Profile
30 Destination PCS Data
32 Original Source PCS Data
34 Identity slope
36 Constant Second Derivative
38 Finite Adjustment
40 Compensated Source PCS Data
42 Processor
44 Memory
48 User Interface
50 Source Imaging Device
52 Source Device Data Archive
54 Destination Device Data Archive
56 Destination Imaging Device

The invention claimed is:

1. A method for mapping color values from a first gamut to a second gamut for printing systems and other devices, the method comprising:
   obtaining first device-independent color values in a first gamut;
   converting the first device-independent color values to a first set of RGB color values in an RGB color space that is substantially perceptually uniform;
   applying, with a processor, a nonlinear tone compression mapping to the first RGB color values to produce second RGB color values;
   converting the second RGB values to second device-independent color values in the second gamut;
   wherein applying the nonlinear tone compression mapping comprises:
   applying, with a processor, a black point correction offset to second RGB color values corresponding to a first range of tones;
   wherein the black point correction is a maximum in a vicinity of black and approaches zero in a vicinity of white; and
   wherein a slope of the black point corrected RGB values approaches one in the vicinity of white.

2. The method of claim 1, wherein the black point correction offset is a fixed offset.

3. The method of claim 1, wherein applying the nonlinear tone compression mapping includes applying a varying tone compression across a range of tones including the first and a second ranges of tones.

4. The method of claim 3, wherein an amount of the varying tone compression increases gradually from the first range of tones to the second range of tones.

5. The method of claim 1, wherein the first range of tones substantially corresponds to shadow tones, and a second range of tones substantially corresponds to highlight tones.

6. The method of claim 1, further comprising applying the tone compression mapping based on a mathematical function.

7. A method for mapping color values from a first gamut to a second gamut for printing systems and other devices, the method comprising:
   obtaining first device-independent color values in the first gamut;
   applying, with a processor, a nonlinear tone compression mapping to the first device-independent color values to produce second device-dependent color values in the second gamut; and
   wherein applying the nonlinear tone compression mapping includes applying the following expression to the color values:

$$f(x)=BPC+(1-BPC)xBPCx(1-x),$$

$$f(x)=BPCx^2+(1-2BPC)x+BPC,$$

wherein x represents the color values and BPC represents the black point correction offset.

8. The method of claim 1, wherein the perceptual RGB color space has a gamma in a range of approximately 1.5 to 3.0.

9. The method of claim 1, wherein the first gamut is a red, green, blue (RGB) gamut and the second gamut is a cyan, magenta, yellow, black (CMYK) gamut.

10. The method of claim 1, wherein the first gamut is associated with a red, green, blue (RGB) device and the second gamut is associated with a cyan, magenta, yellow, black (CMYK) newspaper printer.

11. A system for mapping color values from a first gamut to a second gamut, the system comprising a processor programmed to:
   obtain first device-independent color values in a first gamut;
   apply a nonlinear tone compression mapping to the first device-independent color values to produce second device-dependent color values in the second gamut; and
   wherein the nonlinear tone compression mapping includes application of the following expression to the color values:

$$f(x)=BPC+(1-BPC)x-BPCx(1-x),$$

$$f(x)=BPCx^2+(1-2BPC)x+BPC,$$

wherein x represents the color values and BPC represents the black point correction offset.

12. A computer-readable medium comprising instructions to cause a processor to:

obtain first device-independent color values in a first gamut;

apply a nonlinear tone compression mapping to the first device-independent color values to produce second device-dependent color values in the second gamut; and wherein application of the nonlinear tone compression mapping includes application of the following expression to the color values:

$$f(x)=BPC+(1-BPC)x-BPCx(1-x),$$

$$f(x)=BPCx^2+(1-2BPC)x+BPC,$$

wherein x represents the color values and BPC represents a black point correction offset.

* * * * *

UNITED STATES PATENT AND TRADEMARK OFFICE
CERTIFICATE OF CORRECTION

PATENT NO. : 7,554,705 B2 Page 1 of 1
APPLICATION NO. : 11/354482
DATED : June 30, 2009
INVENTOR(S) : Christopher J. Edge It is certified that error appears in the above-identified patent and that said Letters Patent is hereby corrected as shown below:

Issued Patent
| Column | Line | |
|---|---|---|
| 16 | 37 | In Claim 7, delete "$f(x)=BPC+(1-BPC)xBPCx(1-x)$," and insert -- $f(x)=BPC+(1-BPC)x-BPCx(1-x)$, -- |

Signed and Sealed this

Twenty-seventh Day of July, 2010

David J. Kappos
*Director of the United States Patent and Trademark Office*